US010023052B2

(12) United States Patent
Oba

(10) Patent No.: US 10,023,052 B2
(45) Date of Patent: Jul. 17, 2018

(54) POWER SUPPLY SYSTEM

(71) Applicant: Toyota Jidosha Kabushiki Kaisha, Toyota-shi, Aichi-ken (JP)

(72) Inventor: Tomoko Oba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 246 days.

(21) Appl. No.: 15/227,219

(22) Filed: Aug. 3, 2016

(65) Prior Publication Data
US 2017/0036550 A1 Feb. 9, 2017

(30) Foreign Application Priority Data

Aug. 5, 2015 (JP) .................. 2015-155120

(51) Int. Cl.
| B60L 11/08 | (2006.01) |
| H02M 7/44 | (2006.01) |
| B60L 11/18 | (2006.01) |
| H02H 3/00 | (2006.01) |
| H02M 3/155 | (2006.01) |
| H02M 7/5387 | (2007.01) |
| H02M 1/00 | (2006.01) |

(52) U.S. Cl.
CPC .......... *B60L 11/08* (2013.01); *B60L 11/1809* (2013.01); *H02H 3/00* (2013.01); *H02M 3/155* (2013.01); *H02M 7/44* (2013.01); *H02M 7/5387* (2013.01); *H02M 2001/007* (2013.01)

(58) Field of Classification Search
CPC ...... H02J 1/102; H02J 3/36; H02J 1/10; H02J 1/08; H02J 3/382
USPC ................... 307/82; 323/271, 282
See application file for complete search history.

(56) References Cited

U.S. PATENT DOCUMENTS

| 4,439,806 A | 3/1984 | Brajder | |
| 2012/0013182 A1* | 1/2012 | Minegishi | B60K 6/365 307/9.1 |
| 2016/0105112 A1* | 4/2016 | Ukegawa | H02H 7/1213 323/271 |

FOREIGN PATENT DOCUMENTS

| JP | S57160325 A | 10/1982 |
| JP | 2010226869 A | 10/2010 |

(Continued)

OTHER PUBLICATIONS

U.S. Appl. No. 15/202,756, filed Jul. 6, 2016—Inventor: Tomoko Oba et al.

*Primary Examiner* — Quan Tra
(74) *Attorney, Agent, or Firm* — Dinsmore & Shohl LLP

(57) ABSTRACT

A power supply system is for supplying electric power to a load via a power supply line. The power supply system includes power storage device, a voltage converter, a switchgear, an abnormality signal output device and an electronic control unit. The abnormality signal output device is configured to output an abnormality signal when an abnormality of one switching element of the voltage converter is detected. The electronic control unit is configured to a) control switching elements of the voltage converter and the switchgear; b) switch the switchgear from the connected state to the disconnected state when receiving the abnormality signal from the abnormality signal output device; c) output an ON signal to close the one switching element whose abnormality is detected; and d) identify that the abnormality is short circuit failure when receiving the abnormality signal from the abnormality signal output device again after execution of b) and c).

3 Claims, 7 Drawing Sheets

(56) References Cited

FOREIGN PATENT DOCUMENTS

| JP | 2014-054102 A | 3/2014 |
| JP | 2015136269 A | 7/2015 |
| WO | 2014037787 A2 | 3/2014 |

\* cited by examiner

FIG. 2

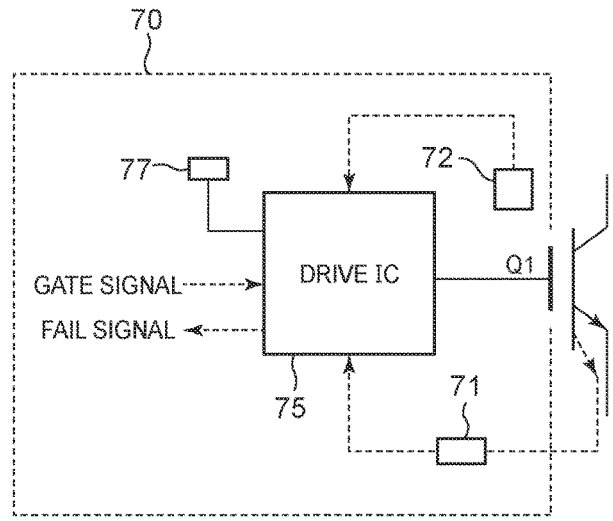

FIG. 3

< FAIL SIGNAL OUTPUT PATTERNS >

| PATTERNS | FUSE | CAUSE OF OUTPUT OF FAIL SIGNAL | PREDICTED ABNORMALITY |
|---|---|---|---|
| A | CONNECTED STATE | LOWERING OF OUTPUT VOLTAGE OF DRIVE POWER SUPPLY (GATE SIGNAL IN ON STATE) | SHORT CIRCUIT FAILURE |
| B | CONNECTED STATE | OVERCURRENT | SHORT CIRCUIT FAILURE OR ABNORMALITY OTHER THAN SHORT CIRCUIT FAILURE |
| C | CONNECTED STATE | OVERHEAT | SHORT CIRCUIT FAILURE OR ABNORMALITY OTHER THAN SHORT CIRCUIT FAILURE |
| D | DISCONNECTED STATE | LOWERING OF OUTPUT VOLTAGE OF DRIVE POWER SUPPLY (GATE SIGNAL IN ON STATE) | SHORT CIRCUIT FAILURE |

※ [......] IS PATTERN THAT CAN BE NARROWED BY CONFIRMATION PROCESSING

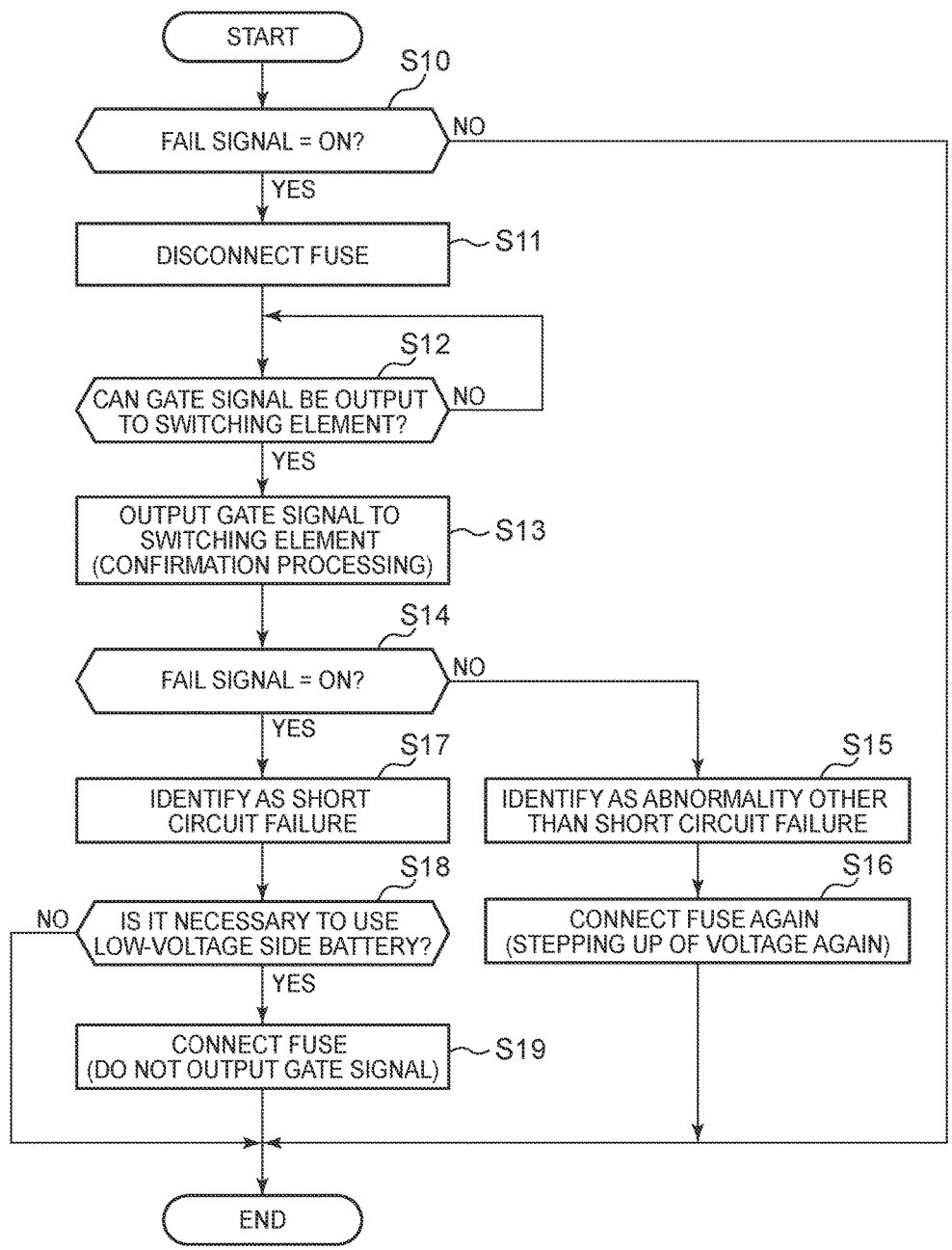

POWER SUPPLY SYSTEM

CROSS-REFERENCE TO RELATED APPLICATIONS

This application claims priority to Japanese Patent Application No. 2015-155120 filed on Aug. 5, 2015, the entire contents of which are hereby incorporated by reference.

BACKGROUND

1. Technical Field

The present disclosure relates to a power supply system and, in particular, to a power supply system that supplies electric power to a load.

2. Description of Related Art

A power supply system that supplies electric power to a load such as a motor is mounted in electrically driven vehicles that include an electric vehicle, a hybrid vehicle, and the like.

For example, an electric vehicle that is provided with a step-up converter between a motor and a battery is disclosed in Japanese Patent Application Publication No. 2014-54102 (JP 2014-54102 A). In this electric vehicle, in the case where it is detected that short circuit failure occurs in a switching element of the step-up converter, the switching element is disconnected from the battery by a breaker.

As a drive module for driving the switching element, a drive module that is configured to output an abnormality signal in the case where an abnormality occurs in the switching element is available. When the abnormality that has occurred in the switching element can be identified as the short circuit failure by using this abnormality signal, it is possible to determine whether to actuate the breaker.

However, if the drive module is configured to output a common abnormality signal for both of the cases where the short circuit failure occurs and where an abnormality other than the short circuit failure occurs, the detected abnormality cannot be identified as the short circuit failure even if the abnormality signal was output.

SUMMARY

The following description is written based on the assumption that the common abnormality signal is output during both of the occurrence of the short circuit failure and the occurrence of the abnormality other than the short circuit failure in the switching element. The present disclosure provides a power supply system that can identify, even in such a case, whether a short circuit failure of a switching element is occurring or not.

A power supply system according to the present disclosure supplies electric power to a load. The power supply system includes a power storage device, a voltage converter, a switchgear, an electronic control unit, and an abnormality signal output device. The power storage device can supply the electric power to a power supply line connected to the load. The voltage converter includes: an upper switching element that is provided between a positive electrode of the power storage device and the power supply line; and a lower switching element that is provided between a negative electrode of the power storage device and a path for connecting the positive electrode of the power storage device and the upper switching element. The switchgear is configured to be switchable between a disconnected state, in which one switching element of the upper switching element and the lower switching element is disconnected from the power storage device, and a connected state, in which the one switching element is connected to the power storage device. The electronic control unit controls the upper switching element, the lower switching element, and the switchgear. The abnormality signal output device outputs an abnormality signal to the electronic control unit in the case where an abnormality of the one switching element is detected. The electronic control unit switches the switchgear from the connected state to the disconnected state and then outputs an ON signal for closing the one switching element whose abnormality is detected to said switching element when receiving the abnormality signal from the abnormality signal output device. The electronic control unit identifies that the abnormality is short circuit failure when receiving the abnormality signal from the abnormality signal output device again.

According to such a configuration, when the abnormality of the one switching element of the upper switching element and the lower switching element is detected, the abnormality signal is output from the abnormality signal output device to the electronic control unit. Meanwhile, the electronic control unit switches the switchgear from the connected state to the disconnected state and then outputs the ON signal for closing the one switching element whose abnormality is detected to said switching element when receiving the abnormality signal from the abnormality signal output device. The electronic control unit can identify that the abnormality is the short circuit failure when receiving the abnormality signal from the abnormality signal output device again. In this way, even in the case where the common abnormality signal is output in the case where the short circuit failure occurs and in the case where an abnormality other than the short circuit failure occurs, it is possible to identify whether the short circuit failure of the switching element occurs.

The power supply system may include another voltage converter and another power storage device. The other voltage converter is connected in parallel with the voltage converter with respect to the power supply line. The other power storage device can supply electric power whose voltage is higher than that of the power storage device to the power supply line via the other voltage converter. The one switching element is the upper switching element.

According to such a configuration, in the case where the short circuit failure of the low-voltage side upper switching element occurs, a short circuit current is possibly generated from the other power storage device on the high-voltage side to the power storage device on the low-voltage side. However, when receiving the abnormality signal, the electronic control unit switches the switchgear from the connected state to the disconnected state so as to disconnect the low-voltage side upper switching element from the power storage device. Thus, generation of the short circuit current between such power storage devices can be prevented.

The electronic control unit may be configured to identify that the abnormality is an abnormality other than the short circuit failure and to switch the switchgear from the disconnected state to the connected state when not receiving the abnormality signal from the abnormality signal output device again in the case where the electronic control unit switches the switchgear from the connected state to the disconnected state and then outputs an ON signal to the one switching element whose abnormality is detected.

According to such a configuration, the electronic control unit can identify that the detected abnormality is the abnormality other than the short circuit failure when not receiving the abnormality signal from the abnormality signal output device again in the case where the electronic control unit switches the switchgear from the connected state to the disconnected state and then outputs the ON signal to the one switching element whose abnormality is detected. Furthermore, because the switchgear is switched from the disconnected state to the connected state, the electric power from the power storage device whose voltage is converted by the voltage converter can be supplied to the load again.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a view of a configuration of a drive module;

FIG. 3 is a table for explaining output patterns of a fail signal;

FIG. 4 is a flowchart of one example of abnormality identification processing that is executed by an ECU;

DETAILED DESCRIPTION OF EMBODIMENTS

Figure 1:
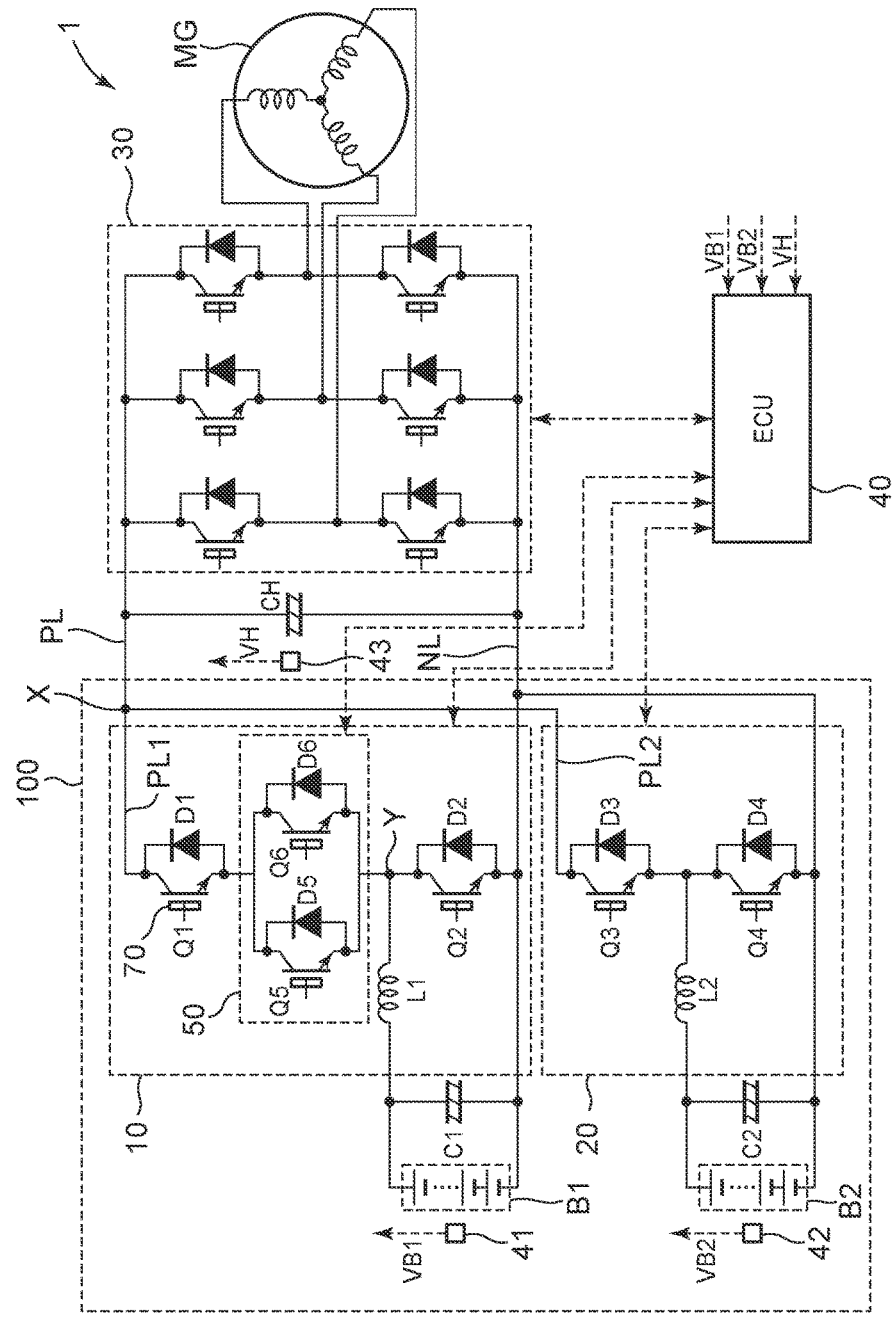
FIG. 1 is a view of a configuration of an electrically driven vehicle.

A detailed description will be made on an embodiment of the present disclosure with reference to the drawings. Note that the same or corresponding parts in the referred drawings are denoted by the same reference numerals and the description thereon will not be repeated.

In this embodiment, as one exemplary mode of an electrically driven vehicle, a description will be made on an electric vehicle in which an engine is not mounted and that can travel by an operation of a motor generator MG. Note that the electrically driven vehicle is not limited to the electric vehicle. It may be a hybrid vehicle that can travel by operations of both of the engine and the motor generator MG.

FIG. 1 is a view of a configuration of an electrically driven vehicle 1. The electrically driven vehicle 1 includes an electronic control unit (ECU) 40, the motor generator MG, an inverter 30, a smoothing capacitor CH, and a power supply system 100.

The ECU 40 corresponds to one embodiment of an "electronic control unit". Although not shown, the ECU 40 is configured by including a central processing unit (CPU), a memory, and a buffer. Based on a map, a program, and the like that are stored in the memory, the ECU 40 executes specified calculation processing. Then, the ECU 40 outputs a command that corresponds to a result of the calculation processing, and thereby controls each device. Note that a part or a whole of the ECU 40 may be configured that the calculation processing is executed by hardware such as an electronic circuit.

The motor generator MG and the inverter 30 correspond to one embodiment of a "load". The motor generator MG rotates drive wheels (not shown) by using AC power that is supplied from the inverter 30. In correspondence with the command from the ECU 40, the inverter 30 converts a DC current that is supplied from the power supply system 100 via a power supply line PL to a three-phase AC current and outputs the three-phase AC current to the motor generator MG.

The smoothing capacitor CH is connected between the power supply line PL and a reference line NL and smoothes a voltage VH between the power supply line PL and the reference line NL. The smoothing capacitor CH is provided with a voltage sensor 43 that detects and outputs the voltage VH to the ECU 40.

The power supply system 100 includes: two of a battery B1 and a battery B2 that can supply electric power to the power supply line PL; a smoothing capacitor C1 that is connected to both terminals of a positive electrode and a negative electrode of the battery B1; a smoothing capacitor C2 that is connected to both terminals of a positive electrode and a negative electrode of the battery B2; a step-up converter 10 that is provided between the battery B1 and each of the power supply line PL and the reference line NL; and a step-up converter 20 that is provided between the battery B2 and each of the power supply line PL and the reference line NL.

The battery B1 corresponds to one embodiment of a "power storage device", and the battery B2 corresponds to one embodiment of "another power storage device". Each of the battery B1 and the battery B2 is a DC power supply that is configured to be chargeable and dischargeable and is, for example, a secondary battery such as a lithium-ion battery or a nickel hydrogen battery or configured by including a power storage element such as an electric double-layer capacitor. Note that each of the battery B1 and the battery B2 may be configured to be chargeable by using electric power from the outside. For example, the battery B1 and the battery B2 may be connected to a charger that can be connected to an external power supply, and the electric power may be supplied from the external power supply to the battery B1 and the battery B2 when a user connects the charger to the external power supply.

The battery B2 is connected in parallel with the battery B1 with respect to the power supply line PL. In this embodiment, the battery B2 can supply the electric power at a higher voltage than that of the battery BI to the power supply line PL.

The smoothing capacitor C1 smoothes a voltage VB1 between the terminals of the battery B1. The battery B1 is provided with a voltage sensor 41 that detects and outputs the voltage VB1 to the ECU 40.

The smoothing capacitor C2 smoothes a voltage VB2 between the terminals of the battery B2. The battery B2 is provided with a voltage sensor 42 that detects and outputs the voltage VB2 to the ECU 40.

The step-up converter 10 corresponds to one embodiment of a "voltage converter". The step-up converter 10 steps up the voltage of the battery B1 and supplies the electric power to the power supply line PL.

The step-up converter 10 includes: an upper arm element configured by including a switching element Q1 and a diode D1 that are provided between the positive electrode of the battery B1 and the power supply line PL; and a lower arm element configured by including a switching element Q2 and a diode D2 that are provided between the negative electrode of the battery B1 and a path for connecting the positive electrode of the battery B1 and the switching element Q1. More specifically, one end of a reactor L1 is connected to the positive electrode of the battery B1, and the upper arm element is provided between the other end of the reactor L1 and the power supply line PL. In addition, the lower arm element is provided between the other end of the reactor L1 and the negative electrode of the battery B1. Hereinafter, the end of the reactor L1 that is connected to the positive electrode of the battery B1 will also be referred to as the "one end of the reactor L1", and the end of the reactor L1 that is connected to the switching element Q2 will also be referred to as the "other end of the reactor L1".

The switching element 1 corresponds to one embodiment of each of an "upper switching element" and "one switching element". The switching element Q1 is constructed of an IGBT element. A collector of the switching element Q1 is connected to the power supply line PL via a supply line PL1. Note that the supply line PL1 is a line that supplies the electric power from the battery 131 to the power supply line PL. A cathode of the diode D1 is connected to the collector of the switching element Q1. An anode of the diode D1 is connected to an emitter of the switching element QI.

The switching element Q2 corresponds to one embodiment of a "lower switching element". The switching element Q2 is constructed of the IGBT element. A collector of the switching element Q2 is connected to the other end of the reactor L1. An emitter of the switching element Q2 is connected to the negative electrode of the battery B1. A cathode of the diode D2 is connected to the collector of the switching element Q2. An anode of the diode D2 is connected to the emitter of the switching element Q2.

In correspondence with the command that is output from the ECU 40 on the basis of the voltage VB1 detected by the voltage sensor 41 and the voltage VH detected by the voltage sensor 43, the step-up converter 10 with such a configuration steps up the voltage of the battery B1 and supplies the electric power to the power supply line PL.

For example, in the step-up converter 10 during a step-up operation, the switching element Q1 remains in an OFF state, and the switching element Q2 is controlled to be in an ON state and an OFF state repeatedly at a specified duty ratio. Note that the switching element is in an opened state, that is, a non-conductive state when the switching element is in the OFF state, and the switching element is in a closed state, that is, a conductive state when the switching element is in the ON state. In this way, a current that flows when the switching element Q2 is ON is accumulated as electromagnetic energy in the reactor L1. Then, when the switching element Q2 is shifted to the OFF state, the accumulated electromagnetic energy is superposed on a discharged current. In this way, the voltage of the battery B1 is stepped up.

The step-up converter 20 corresponds to one embodiment of the "other voltage converter". The step-up converter 20 is connected in parallel with the step-up converter 10 with respect to the power supply line PL. The step-up converter 20 steps up the voltage of the battery B2 and supplies the electric power to the power supply line PL.

The step-up converter 20 includes: an upper arm element configured by including a switching element Q3 and a diode D3 that are provided between the positive electrode of the battery B2 and the power supply line PL; and a lower arm element configured by including a switching element Q4 and a diode D4 that are provided between the negative electrode of the battery B2 and a path for connecting the positive electrode of the battery B2 and the switching element Q3. More specifically, one end of a reactor L2 is connected to the positive electrode of the battery B2, and the upper arm element is provided between the other end of the reactor L2 and the power supply line PL. In addition, the lower arm element is provided between the other end of the reactor L2 and the negative electrode of the battery B2.

Because the upper arm element (the switching element Q3, the diode D3) of the step-up converter 20 has a similar configuration to the upper arm element (the switching element Q1, the diode D1) of the step-up converter 10 described above, the description thereon will not be made. In addition, because the lower arm element (the switching element Q4, the diode D4) of the step-up converter 20 has a similar configuration to the lower arm element (the switching element Q2, the diode D2) of the step-up converter 10 described above, the description thereon will not be made.

In correspondence with the command that is output from the ECU 40 on the basis of the voltage VB2 detected by the voltage sensor 42 and the voltage VH detected by the voltage sensor 43, the step-up converter 20 with such a configuration steps up the voltage of the battery B2 and supplies the electric power to the power supply line PL. Because a step-up operation of the step-up converter 20 is similar to the step-up operation of the step-up converter 10, the description thereon will not be made.

Note that the step-up converters 10, 20 are operated as step-up circuits; however, they may be operated as step-down circuits when the electric power that is generated by the motor generator MG is returned to the batteries B1, B2 during regenerative braking of the electrically driven vehicle 1.

By using the two batteries B1, B2 and the two step-up converters 10, 20 as described above, the electric power that is sufficient for an operation of the motor generator MG can stably be secured. Even in the case where a power storage state of one of the batteries is degraded or where short circuit failure occurs in the switching element, the electric power of the other battery can be supplied to the power supply line PL.

The step-up converter 10 is provided with a fuse 50 in a path between the other end of the reactor L1 and a connection point X of the power supply line PL and a supply line PL2 through which the electric power from the battery B2 is supplied to the power supply line PL. In this embodiment, the fuse 50 is provided between the switching element Q1 and a connection point Y of the other end of the reactor L1 and the switching element Q2.

The fuse 50 corresponds to one embodiment of a "switchgear". In correspondence with the command that is output from the ECU 40, the fuse 50 is configured to be switchable between a disconnected state, in which the upper arm element including the switching element Q1 is disconnected from the battery B1, and a connected state, in which the upper arm element including the switching element Q1 is connected to the battery B1.

The fuse 50 includes: a switching element Q5 that is constructed of the IGBT element in the same specification as that in the switching element Q1; a switching element Q6 that is constructed of the IGBT element in the same specification as that in the switching element Q2; a diode D5 in the same specification as the diode D1; and a diode D6 in the same specification as the diode D2. Note that the same specification means that components are in the same shape (for example, packages thereof are the same) and exhibit the same performance. That is, in the case where the components are in the same specification, the components can be commonalized. Note that the switching elements Q1 to Q6 are not limited to the IGBT elements but may each be constructed of a MOSFET or a bipolar transistor.

A collector of the switching element Q5 and a collector of the switching element Q6 are connected to the emitter of the switching element Q1. An emitter of the switching element Q5 and an emitter of the switching element Q6 are connected to the other end of the reactor L1 and the collector of the switching element Q2. A cathode of the diode D5 is connected to the collector of the switching element Q5. An anode of the diode D5 is connected to the emitter of the switching element Q5. A cathode of the diode D6 is connected to the collector of the switching element Q6. An anode of the diode D6 is connected to the emitter of the switching element Q6.

During a normal operation of the step-up converter 10, a short circuit current is not generated from the high-voltage side battery B2 toward the low-voltage side battery B1 in the power supply system 100. However, in the case where the short circuit failure of the switching element Q1 (failure caused by a short circuit between the collector and the emitter of the switching element Q1, causing the switching element Q1 to constantly remain in the ON state) occurs in the step-up converter 10 while the fuse 50 is in the connected state, the short circuit current is possibly generated from the battery B2 toward the battery B1 due to a fact that the voltage by the battery B2 that is higher than the voltage by the battery B1 is applied to the connection point X.

Accordingly, in the case where the switching element Q1 is normal, the ECU 40 brings the switching element Q5 and the switching element Q6 into the ON states and brings the fuse 50 into the connected state. On the other hand, in the case where an abnormality occurs in the switching element Q1, the ECU 40 brings the switching element Q5 and the switching element Q6 into the OFF states and brings the fuse 50 into the disconnected state. Just as described, even in the case where the abnormality that occurs in the switching element Q1 is the short circuit failure, generation of the short circuit current from the battery B2 toward the battery B1 can be prevented by disconnecting the switching element Q1 from the battery B1.

Because the fuse 50 disconnects the path between the connection point X and the other end of the reactor L1, damage to the reactor L1 that is caused by application of the voltage of the battery B2 to the reactor L1 can be prevented, and application of the voltage of the battery B2 to the smoothing capacitor C1 can also be prevented.

A drive module 70 is connected to the switching element Q1. Note that the drive module 70 is not limited to its connection to the switching element Q1. The drive modules 70 are respectively connected to the switching elements included in the switching elements Q2 to Q6 and the inverter 30. A description will hereinafter be made on the drive module 70 that is connected to the switching element Q1.

FIG. 2 is a view of a configuration of the drive module 70. The drive module 70 includes a drive power supply 77, a current sensor 71, a temperature sensor 72, and a drive IC 75. Note that the drive IC 75 corresponds to one embodiment of an "abnormality signal output device".

The drive power supply 77 supplies the electric power from another battery, which is not shown, to the drive IC 75. The current sensor 71 is configured by including a resistor, for example, and detects and outputs the current flowing through the emitter of the switching element Q1 to the drive IC 75. The temperature sensor 72 is configured by including a diode, for example, and detects and outputs a temperature of the switching element Q1 to the drive IC 75.

The ECU 40 outputs a gate signal for closing the switching element Q1 to said switching element Q1. The gate signal corresponds to one embodiment of an "ON signal". The switching element Q1 receives the gate signal, which is output from the ECU 40, via the drive IC 75, In the case where the switching element Q1 receives the gate signal, the gate signal is brought into an ON state. In the case where the switching element Q1 does not receive the gate signal, the gate signal is brought into an OFF state. In the case where the drive IC 75 receives the gate signal from the ECU 40, that is, in the case where the gate signal is in the ON state, a specified voltage (for example, 15 V) is applied to a gate of the switching element Q1 by using the electric power that is supplied from the drive power supply 77. When the specified voltage is applied to the gate, the switching element Q1 is brought into the ON state. On the other hand, in the case where the gate signal is in the OFF state, the specified voltage is not applied to the gate, and thus the switching element Q1 is brought into the OFF state.

The drive IC 75 outputs a fail signal that is common between the case where the short circuit failure occurs and the case where the abnormality other than the short circuit failure occurs. The fail signal corresponds to one embodiment of an "abnormality signal". In the case where the fail signal is output, the fail signal is brought into the ON state. In the case where the fail signal is not output, the fail signal is brought into the OFF state.

FIG. 3 is a table for explaining output patterns of the fail signal. As shown in FIG. 3, in the cases where the fuse 50 is in the connected state and where an overcurrent that is a current detected by the current sensor 71 whose intensity is at least equal to a specified value is generated, the drive IC 75 outputs the fail signal to the ECU 40 (a pattern B in FIG. 3). The overcurrent is generated not only in the case where the short circuit failure occurs in the switching element Q1 but also in the case where the abnormality other than the short circuit failure (for example, failure of a component other than the switching element Q1) occurs. Meanwhile, in the case where the fuse 50 is in the disconnected state, the current does not flow through the switching element Q1. Accordingly, the overcurrent is not generated, and the drive IC 75 does not output the fail signal.

In addition, as shown in FIG. 3, in the cases where the fuse 50 is in the connected state and where overheat in which the temperature detected by the temperature sensor 72 becomes at least equal to a specified value occurs, the drive IC 75 outputs the fail signal to the ECU 40 (a pattern C in FIG. 3). The overheat occurs not only in the case where the short circuit failure occurs in the switching element Q1 but also in the case where the abnormality other than the short circuit failure occurs. Meanwhile, in the case where the fuse 50 is in the disconnected state, the current does not flow through the switching element Q1. Accordingly, the overheat does not occur, and the drive IC 75 does not output the fail signal.

Furthermore, as shown in FIG. 3, in the cases where the fuse 50 is in the connected state, where the gate signal is in the ON state, and where an output voltage of the drive power supply 77 is lowered to be at most equal to a specified value, the drive IC 75 outputs the fail signal to the ECU 40 (a pattern A in FIG. 3). Here, when the short circuit failure occurs in the switching element Q1, a section between the gate and the emitter is also short circuited in conjunction with the short circuit of a section between the collector and the emitter. Accordingly, when the switching element Q1 receives the gate signal from the ECU 40 during the short circuit failure, the output voltage of the drive power supply 77 is lowered due to a flow of the short circuit current through the section between the gate and the emitter. The drive IC 75 detects lowering of the output voltage of this drive power supply 77. The lowering of the output voltage of the drive power supply 77 is detected only in the case where the short circuit failure occurs in the switching element Q1. Note that, also in the cases where the fuse 50 is in the disconnected state and where the gate signal is in the ON state, the drive IC 75 outputs the fail signal in order to detect the lowering of the output voltage of the drive power supply 77 (a pattern D in FIG. 3).

As described by using FIG. 3, the drive IC 75 outputs the common fail signal in the case where the short circuit failure occurs and in the case where the abnormality other than the short circuit failure occurs. Accordingly, the ECU 40 cannot identify that the detected abnormality is the short circuit failure of the switching element Q1 only by receiving the fail signal in the case where the fuse 50 is in the connected state. Accordingly, even in the case where the abnormality other than the short circuit failure occurs, a possibility of the occurrence of the short circuit failure of the switching element Q1 is not zero. Thus, the fuse 50 cannot be brought into the connected state again. Meanwhile, in the case where the fuse 50 remains in the disconnected state despite a fact that the short circuit failure does not occur in the switching element Q1, only the electric power of the battery B2 can be supplied to the power supply line PL. Accordingly, a long-time travel of the electrically driven vehicle 1 cannot be made. Furthermore, an abnormality, such as control breakdown, possibly occurs in the step-up converter 20 that is connected to the battery B2.

In view of the above-described problem, the ECU 40 executes abnormality identification processing shown in FIG. 4 and thereby identifies whether the detected abnormality is the short circuit failure of the switching element Q1 when receiving the fail signal from the drive IC 75. Hereinafter, a detailed description thereon will be made.

As shown by the pattern D in FIG. 3, in the cases where the fuse 50 is in the disconnected state, where the gate signal is in the ON state, and where the abnormality is the short circuit failure, the output voltage of the drive power supply 77 is lowered, and thus the drive IC 75 outputs the fail signal. On the other hand, in the case where the abnormality is the one other than the short circuit failure, the output voltage of the drive power supply 77 is not lowered, and thus the fail signal is not output. By using this, when receiving the fail signal from the drive IC 75, the ECU 40 switches the fuse 50 from the connected state to the disconnected state and then outputs the gate signal to the switching element Q1 whose abnormality is detected. Note that such processing by the ECU 40 is also referred to as confirmation processing. In this way, the ECU 40 creates a situation of the pattern D, which is shown in FIG. 3. Accordingly, when receiving the fail signal from the drive IC 75 again during the confirmation processing, the ECU 40 can identify that the detected abnormality is the short circuit failure. In this way, even when the common fail signal is output in the case where the short circuit failure occurs and in the case where the abnormality other than the short circuit failure occurs, it is possible to identify whether the short circuit failure of the switching element Q1 occurs.

Figure 5A:
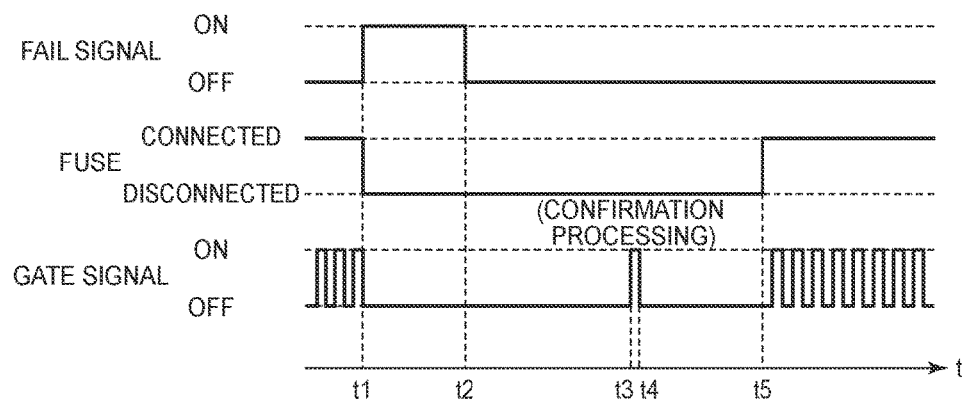
FIG. 5A includes timing chart, which shows one example of a change in an output state of a signal during occurrence of an abnormality.
Figure 5B:
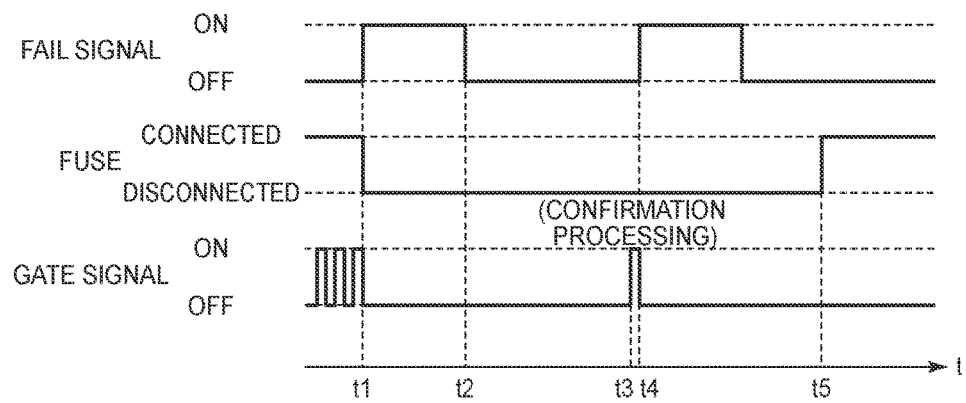
FIG. 5B includes timing chart, which shows one example of a change in an output state of a signal during occurrence of an abnormality.

A detailed description will be made on the abnormality identification processing with reference to FIG. 4, FIG. 5A and FIG. 5B. FIG. 4 is a flowchart of one example of the abnormality identification processing that is executed by the ECU 40. Note that a description will herein be made on the abnormality identification processing for identifying the abnormality that has occurred in the switching element Q1. Each step (hereinafter abbreviated as S) of the flowchart shown in FIG. 4 is basically realized by software processing by the ECU 40 but may be realized by the hardware (the electronic circuit) that is manufactured in the ECU 40. Meanwhile, FIG. 5A shows one example of an output state of the signal in the case where the abnormality other than the short circuit failure occurs in the upper arm element, which is connected to the low-voltage side battery B1, that is, the switching element Q1, and FIG. 5B shows one example of a change in the output state of the signal in the case where the short circuit failure occurs in the switching element Q1.

The processing in FIG. 4 is started with the case where the fuse 50 is in the connected state. As shown in FIG. 4, the ECU 40 determines whether the fail signal is brought into the ON state (S10). The ECU 40 identifies that the fail signal is in the ON state when receiving the fail signal. The ECU 40 identifies that the fail signal is in the OFF state when not receiving the fail signal.

If the fail signal is in the OFF state (NO in S10), the ECU 40 terminates this processing.

On the other hand, if the fail signal is in the ON state (YES in S10), the ECU 40 brings the fuse 50 into the disconnected state (S11). It is because, at this time point, the ECU 40 cannot identify whether the detected abnormality is the short circuit failure of the switching element Q1. For example, as shown in FIGS. 5A, 5B, in the case where the fail signal is brought into the ON state at timing t1, the ECU 40 brings the fuse 50 into the disconnected state.

In this way, even in the case where the short circuit failure of the switching element Q1 occurs, the occurrence of the short circuit current from the battery B2 toward the battery B1 can be prevented. In addition, once the fuse 50 is brought into the disconnected state, the current no longer flows through the switching element Q1. Accordingly, the overcurrent or the overheat does not occur, and the fail signal is gradually switched from the ON state to the OFF state.

In addition, in the case where the ECU 40 outputs the gate signal at a time when the fuse 50 is brought into the disconnected state, the ECU 40 stops outputting the gate signal.

Next, the ECU 40 determines whether it is in a state where the gate signal can be output to the switching element Q1 (S12). For example, the ECU 40 determines whether it is in a state where the fail signal is switched from the ON state to the OFF state and the switching element Q1 can receive the gate signal via the drive IC 75. For example, as shown in FIGS. 5A and 5B, the ECU 40 determines whether it is in a state where the fail signal is switched from the ON state to the OFF state at timing t2 and thereafter the switching element Q1 can receive the gate signal for a specified period.

If the gate signal cannot be output to the switching element Q1 (NO in S12), the ECU 40 repeats the processing in S12.

On the other hand, if the gate signal can be output to the switching element Q1 (YES in S12), the ECU 40 makes the fuse 50 remain in the disconnected state and executes the confirmation processing for outputting the gate signal to the switching element Q1 (S13). For example, as shown in FIGS. 5A and 5B, when the switching element Q1 is brought into a state to be able to receive the gate signal at tuning t3, the ECU 40 makes the fuse 50 remain in the disconnected state and outputs the gate signal to the switching element Q1. In this way, the ECU 40 creates the situation of the pattern D, which is shown in FIG. 3.

After S13, the ECU 40 receives the fail signal from the drive IC 75 again during the confirmation processing and determines whether the fail signal is brought into the ON state (S14).

If the fail signal remains in the OFF state (NO in S14) despite a fact that the gate signal is output to the switching element Q1 while the fuse 50 remains in the disconnected state as shown in the pattern D, the ECU 40 identifies that the abnormality other than the short circuit failure occurs in the switching element Q1 (S15). For example, as shown in FIG. 5A, in the case where the fail signal remains in the OFF state despite the fact that the gate signal is output to the switching element Q1 at the timing t3, the ECU 40 identifies that the abnormality other than the short circuit failure occurs in the switching element Q1.

In the case where the short circuit failure of the switching element Q1 does not occur, the ECU 40 brings the fuse 50 into the connected state again. In this way, the ECU 40 allows the voltage to be stepped up again by the step-up converter 10 (S16) and terminates this processing. For example, as shown in FIG. 5A, the ECU 40 brings the fuse 50 into the connected state again at timing t5.

In this way, in the case where the short circuit failure does not occur in the switching element Q1, the electric power from the battery B1 whose voltage is stepped up by the step-up converter 10 can be supplied to the power supply line PL again.

On the other hand, in the cases where the gate signal is output to the switching element Q1 while the fuse 50 remains in the disconnected state as in the pattern D and where the fail signal is thereby brought into the ON state again (YES in S14), the ECU 40 identifies that the short circuit failure occurs in the switching element Q1 (S17). For example, as shown in FIG. 5B, in the cases where the gate signal is output to the switching element Q1 at the timing t3 and where the fail signal is brought into the ON state again at later timing t4, the ECU 40 identifies that the short circuit failure of the switching element Q1 occurs.

Next, the ECU 40 determines whether it is necessary to use the low-voltage side battery B1 (S18). As a case where it becomes necessary to use the battery B1 even during the occurrence of the short circuit failure of the switching element Q1, the following can be considered. For example, the electric power is supplied from an auxiliary battery, which is not shown, to a configuration of an auxiliary system such as a brake circuit. Meanwhile, the electric power whose voltage is converted by a DC/DC converter, which is not shown, is supplied to the auxiliary battery. A maximum permissible voltage of this DC/DC converter is determined in advance. Accordingly, the DC/DC converter cannot be used for the high-voltage side battery B2 but can only be used for the low-voltage side battery B1. Thus, in the case where a power storage amount of the auxiliary battery is significantly reduced, it becomes necessary to use the electric power of the battery B1.

If it is necessary to use the battery B1 (YES in SI8), the ECU 40 does not output the gate signal to the switching element Q1 and brings the fuse 50 into the connected state again (S19). For example, as shown in FIG. 5B, in the case where it is necessary to use the battery B1, the ECU 40 brings the fuse 50 into the connected state again at the timing t5. However, in this case, the ECU 40 does not output the gate signal to the switching element Q1 even when the fuse 50 is in the connected state.

In this way, the electric power of the battery B1 can be used again via the switching element Q1, in which the short circuit failure occurs. In addition, the gate signal is not output to the switching element Q1. Thus, the fail signal is not output by detecting lowering of the output voltage of the drive power supply 77 by the drive IC 75.

On the other hand, if it is not necessary to use the battery B1 (NO in S18) or after the processing in S19, the ECU 40 terminates this processing.

As it has been described so far, in the cases where the fuse 50 is in the connected state and where the fail signal is received from the drive IC 75, the ECU 40 according to this embodiment executes the confirmation processing, in which the fuse 50 is switched from the connected state to the disconnected state and the gate signal is then output to the switching element Q1 whose abnormality is detected. In the case where the fail signal is received from the drive IC 75 again during the confirmation processing, the ECU 40 identifies that the detected abnormality is the short circuit failure. In this way, even when the common fail signal is output in the case where the short circuit failure occurs in the switching element Q1 and in the case where the abnormality other than the short circuit failure occurs, it is possible to identify whether the short circuit failure of the switching element Q1 occurs. In the case where it is identified that the abnormality other than the short circuit failure occurs, the ECU 40 can bring the fuse 50 into the connected state again.

In this embodiment, the fuse 50 is configured by including the switching elements Q5, Q6, each of which is constructed of the IGBT element, and the diodes D5, D6. However, the fuse 50 may be configured by including other members. For example, as shown in FIG. 6, the fuse 50 may be configured by including a relay 60.

In this embodiment, the description has been made on the abnormality identification processing for identifying the abnormality occurred in the switching element Q1 that is included in the upper arm element of the step-up converter 10 by using FIG. 4, FIG. 5A and FIG. 5B. However, in addition to the switching element Q1, the abnormality identification processing in this embodiment may be applied to any of the switching element Q2 included in the lower arm element of the step-up converter 10, the switching element Q3 included in the upper arm element of the step-up converter 20, and the switching element Q4 included in the lower arm element of the step-up converter 20 in order to identify the abnormality occurred in any of those. That is, any of the switching element Q2, the switching element Q3, and the switching element Q4 may correspond to the one embodiment of the "one switching element".

Figure 6:
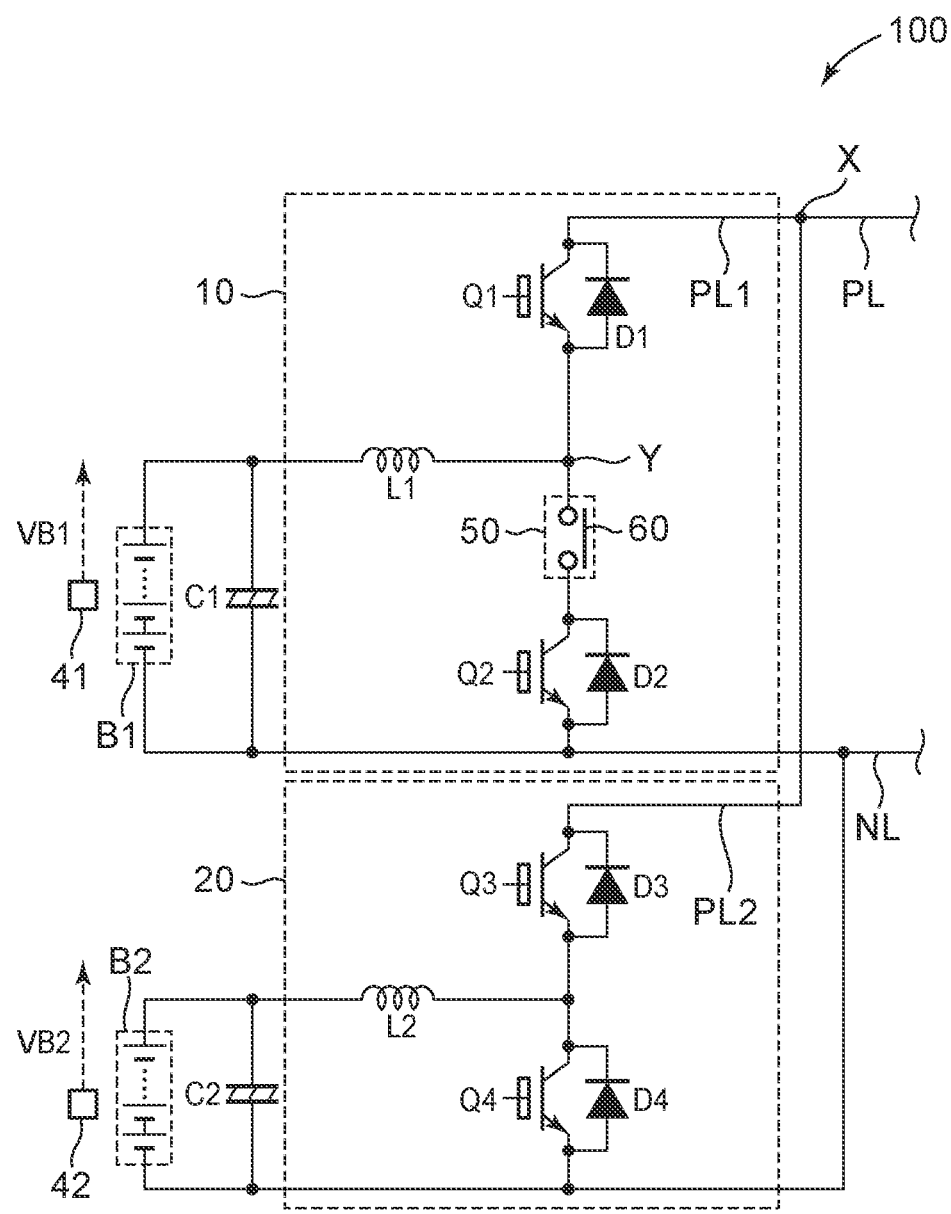
FIG. 6 is a view of a power supply system that includes a relay for disconnecting a lower arm element from a low-voltage side battery, the lower arm element being connected to the battery.

For example, as shown in FIG. 6, the fuse 50 may be provided between the connection point Y and the switching element Q2. Accordingly, even in the case where the short circuit failure of the switching element Q2 occurs by some chance, the switching element Q2 is electrically disconnected from the battery B1 when the fuse 50 is brought into the disconnected state. Thus, the generation of the short circuit current that flows between the positive electrode and the negative electrode of the battery B1 can be prevented. Furthermore, the abnormality identification processing is executed, and the confirmation processing is executed on the switching element Q2 in the case where the fuse 50 is in the disconnected state. In this way, it is possible to identify whether the short circuit failure of the switching element Q2 occurs.

Figure 7:
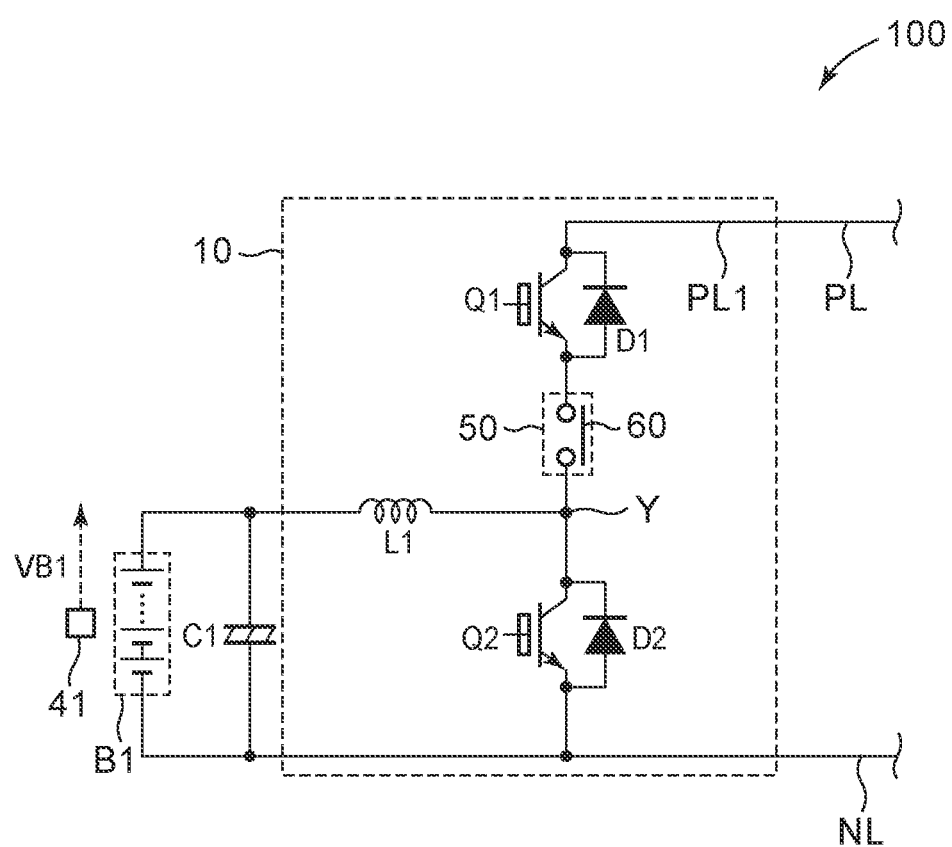
FIG. 7 is a view of a power supply system that includes one battery and one step-up converter and also includes a relay for disconnecting an upper arm element from the battery.

In this embodiment, the power supply system 100 includes the two batteries B1, B2 and the two step-up converters 10, 20. However, as shown in FIG. 7, the power supply system 100 may include the one battery B1 and the one step-up converter 10. Being configured just as described, the power supply system 100 may further be provided with the fuse 50 between the connection point Y and the switching element Q1. The abnormality identification processing is executed, and the confirmation processing is executed on the switching element Q1 in the case where the fuse 50 is in the disconnected state. In this way, even with such a configuration, it is possible to identify whether the short circuit failure of the switching element Q1 occurs.

Figure 8:
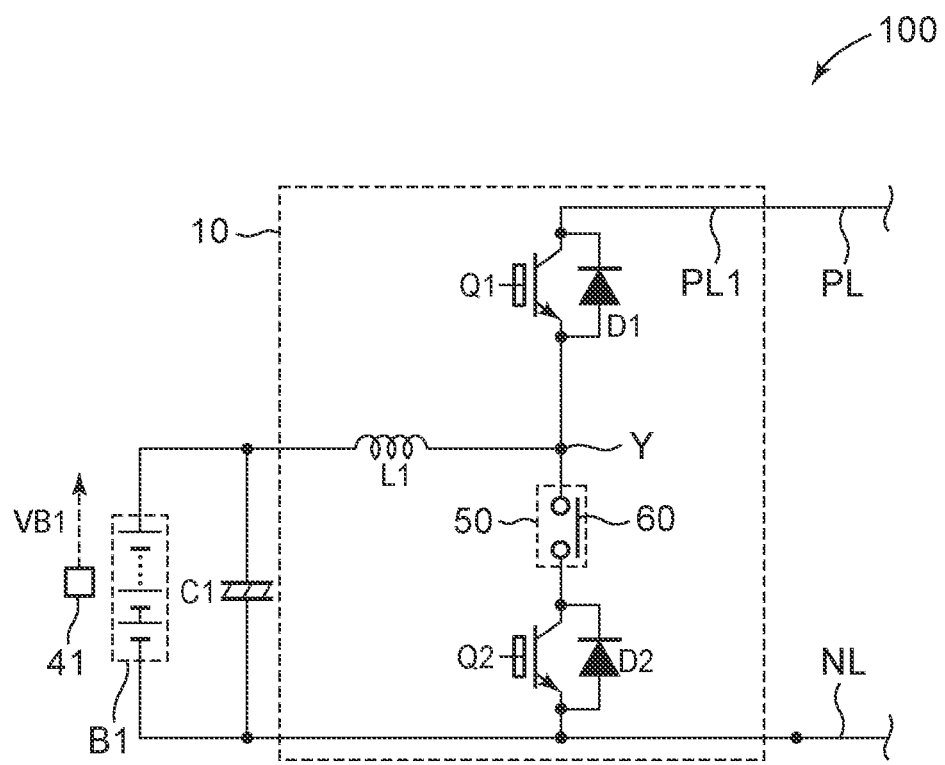
FIG. 8 is a view of a power supply system that includes the one battery and the one step-up converter and also includes a relay for disconnecting the lower arm element from the battery.

As shown in FIG. 8, the power supply system 100 may include the one battery B1 and the one step-up converter 10 and may further be provided with the fuse 50 between the connection point Y and the switching element Q2. The abnormality identification processing is executed, and the confirmation processing is executed on the switching element Q2 in the case where the fuse 50 is in the disconnected state. In this way, even with such a configuration, it is possible to identify whether the short circuit failure of the switching element Q2 occurs.

The above-described embodiment and the modified examples thereof can appropriately be combined.

Here, the embodiment will be summarized. When the abnormality of the switching element Q1 is detected, the drive IC 75 outputs the fail signal to the ECU 40. Meanwhile, in the case where the ECU 40 receives the fail signal from the drive IC 75 when the fuse 50 is in the connected state, the ECU 40 executes the confirmation processing, in which the fuse 50 is switched from the connected state to the disconnected state and the gate signal is then output to the switching element Q1 whose abnormality is detected. In the case where the ECU 40 receives the fail signal from the drive IC 75 again during the confirmation processing, the ECU 40 identifies that the detected abnormality is the short circuit failure.

What is claimed is:

1. A power supply system for supplying electric power to a load via a power supply line, the power supply system comprising:
 a first power storage device being capable of supplying the electric power to the power supply line;
 a first voltage converter including:
  an upper switching element being provided between a positive electrode of the first power storage device and the power supply line; and
  a lower switching element being provided between a negative electrode of the first power storage device and a path that connects the positive electrode of the first power storage device and the upper switching element;
 a switchgear being configured to be switchable between a disconnected state and a connected state, the disconnected state being a state where one switching element among the upper switching element and the lower switching element is disconnected from the first power storage device, and the connected state being a state where the one switching element is connected to the first power storage device;
 an abnormality signal output device being configured to output an abnormality signal when an abnormality of the one switching element is detected; and
 an electronic control unit being configured to:
  a) control the upper switching element, the lower switching element, and the switchgear;
  b) switch the switchgear from the connected state to the disconnected state when receiving the abnormality signal from the abnormality signal output device;
  c) output an ON signal to close the one switching element whose abnormality is detected; and
  d) identify that the abnormality is short circuit failure when receiving the abnormality signal from the abnormality signal output device again after execution of b) and c).

2. The power supply system according to claim 1 further comprising:
 a second voltage converter being connected in parallel with the first voltage converter with respect to the power supply line; and
 a second power storage device being capable of supplying electric power, whose voltage is higher than the voltage of the first power storage device, to the power supply line via the second voltage converter, wherein
 the one switching element is the upper switching element.

3. The power supply system according to claim 1, wherein the electronic control unit is configured to identify that the abnormality is an abnormality other than the short circuit failure and to switch the switchgear from the disconnected state to the connected state when not receiving the abnormality signal from the abnormality signal output device again after the execution of b) and c).

* * * * *